United States Patent [19]
Kato et al.

[11] Patent Number: 5,758,492
[45] Date of Patent: Jun. 2, 1998

[54] FAILURE DETECTION SYSTEM OF ELECTRICALLY HEATED CATALYTIC CONVERTER OF INTERNAL COMBUSTION ENGINE

[75] Inventors: Hiroaki Kato; Yuichi Shimasaki; Takashi Komatsuda; Akihisa Saito; Tetsu Teshirogi; Takuya Aoki; Hideo Furumoto, all of Wako; Takayoshi Nakayama, Haga-machi, all of Japan

[73] Assignee: Honda Giken Kogyo Kabushiki Kaisha, Tokyo, Japan

[21] Appl. No.: 677,314

[22] Filed: Jul. 2, 1996

[30] Foreign Application Priority Data

Jul. 4, 1995 [JP] Japan .................... 7-191245

[51] Int. Cl.$^6$ .................... F01N 3/28; F01N 3/20; F01N 9/00
[52] U.S. Cl. .................... 60/274; 60/277; 60/300; 219/497
[58] Field of Search .................... 60/274, 277, 284, 60/300, 286; 219/202, 497, 205; 422/174, 180, 199; 423/213.2

[56] References Cited

U.S. PATENT DOCUMENTS

| | | | |
|---|---|---|---|
| 5,224,335 | 7/1993 | Yoshizaki | 60/277 |
| 5,428,955 | 7/1995 | Yuuki et al. | 60/277 |
| 5,553,451 | 9/1996 | Harada | 60/277 |
| 5,555,725 | 9/1996 | Shimasaki et al. | 60/277 |
| 5,689,952 | 11/1997 | Kato et al. | 60/300 |
| 5,694,770 | 12/1997 | Bruck et al. | 60/274 |

FOREIGN PATENT DOCUMENTS

| | | |
|---|---|---|
| 1-232246 | 9/1989 | Japan . |
| 2-24550 | 1/1990 | Japan . |

*Primary Examiner*—Willis R. Wolfe
*Attorney, Agent, or Firm*—Nikaido, Marmelstein, Murray & Oram LLP

[57] ABSTRACT

A system for detecting a failure of an electrically heated catalytic converter installed in an exhaust system of the engine for reducing pollutants from exhaust gases emitted from the engine, the catalytic converter having a heater which is connected with the power source to be supplied with current. A parameter such as electric power consumption indicative of an electric resistance of the heater of the catalytic converter. If the parameter is out of a range defined by reference values, it is determined hat a failure has occurred in the heater of the catalytic converter. In the system, reference values at a specific condition based on a correction coefficient obtained on the ratio between the parameter designed before manufacturing and that measured after manufacturing.

20 Claims, 5 Drawing Sheets

FAILURE DETECTION SYSTEM OF ELECTRICALLY HEATED CATALYTIC CONVERTER OF INTERNAL COMBUSTION ENGINE

BACKGROUND OF THE INVENTION

1. Field of the Invention

This invention relates to a system and a method for detecting a failure or trouble of an electrically heated catalytic converter installed at the exhaust system of an internal combustion engine.

2. Description of the Related Art

An internal combustion engine usually has a three-way catalytic converter in the exhaust system which reduces all three types of CO, HC, and NOx emissions that escape through the exhaust system, and which removes pollutants from the exhaust gases in the engine exhaust system. However, the catalyst is ineffective or inactive until its temperature has risen to a high temperature. It takes a long time until the catalytic converter has heated up to the necessary temperature from, for example, cold engine starting. For that reason, a catalytic converter having an electric heater that heats the catalyst to promote the activation is nowadays used.

The electrically heated catalytic converter is configured to have an electric heater in the vicinity of a carrier that carries a catalyst or to have such a carrier inherently manufactured as an electric heater. The heater is supplied with current and heats up by resistance heating. The heater thus supplied with current burns off the unburned exhaust gases generated by the engine and passing through the engine exhaust to promote the activation of the catalytic converter itself and other ordinary catalytic converter(s) installed downstream thereof.

In the electrically heated catalytic converter, it has hitherto been detected if a failure or trouble has occurred in the electrically heated catalytic converter by monitoring the current supplied to the heater, or by monitoring both the current and voltage applied to the heater to determine the electric power and then by determining if the value is within a range for failure detection defined by reference values.

Since, however, the electric load of the electrically heated catalytic converter is quite small, i.e., on the order of same tens or hundreds milliohms in terms of resistance, it has been difficult to decrease variance in manufacturing the converter. Moreover, cables or sensors used in the current supply circuit are not free from their own manufacturing variance. Thus, it has been difficult to properly set the range for failure detection to accurately detect if a failure or trouble has occurred in the electrically heated catalytic converter.

An object of the invention is therefore to solve the drawback of the prior art and to provide a system and a method for accurately detecting a failure or trouble of an electrically heated catalytic converter of an internal combustion engine.

SUMMARY OF THE INVENTION

In order to achieve the object, the present invention provides a system for detecting a failure occurred of an electrically heated catalytic converter of an internal combustion engine, including a catalytic converter installed in an exhaust system of the engine for reducing pollutants from exhaust gases emitted from the engine, the catalytic converter having a heater, a power source, current supplying means for connecting the power source to the heater of the catalytic converter to supply current thereto, parameter detecting means for detecting a parameter indicative of an electric resistance of the heater of the catalytic converter, reference value determining means for determining at least one reference value, comparing means for comparing the parameter with said at least one reference value to determine if a failure has occurred in the heater of the catalytic converter. In the system, correcting means is provided for correcting said at least one reference value based on a value obtained at least by the parameter.

BRIEF DESCRIPTION OF THE DRAWINGS

The above and other objects and advantages of the invention will be more apparent from the following description and drawings, in which.

DESCRIPTION OF THE PREFERRED EMBODIMENTS

Embodiments of the invention, given by way of example only, will now be explained with reference to the drawings.

Figure 1:
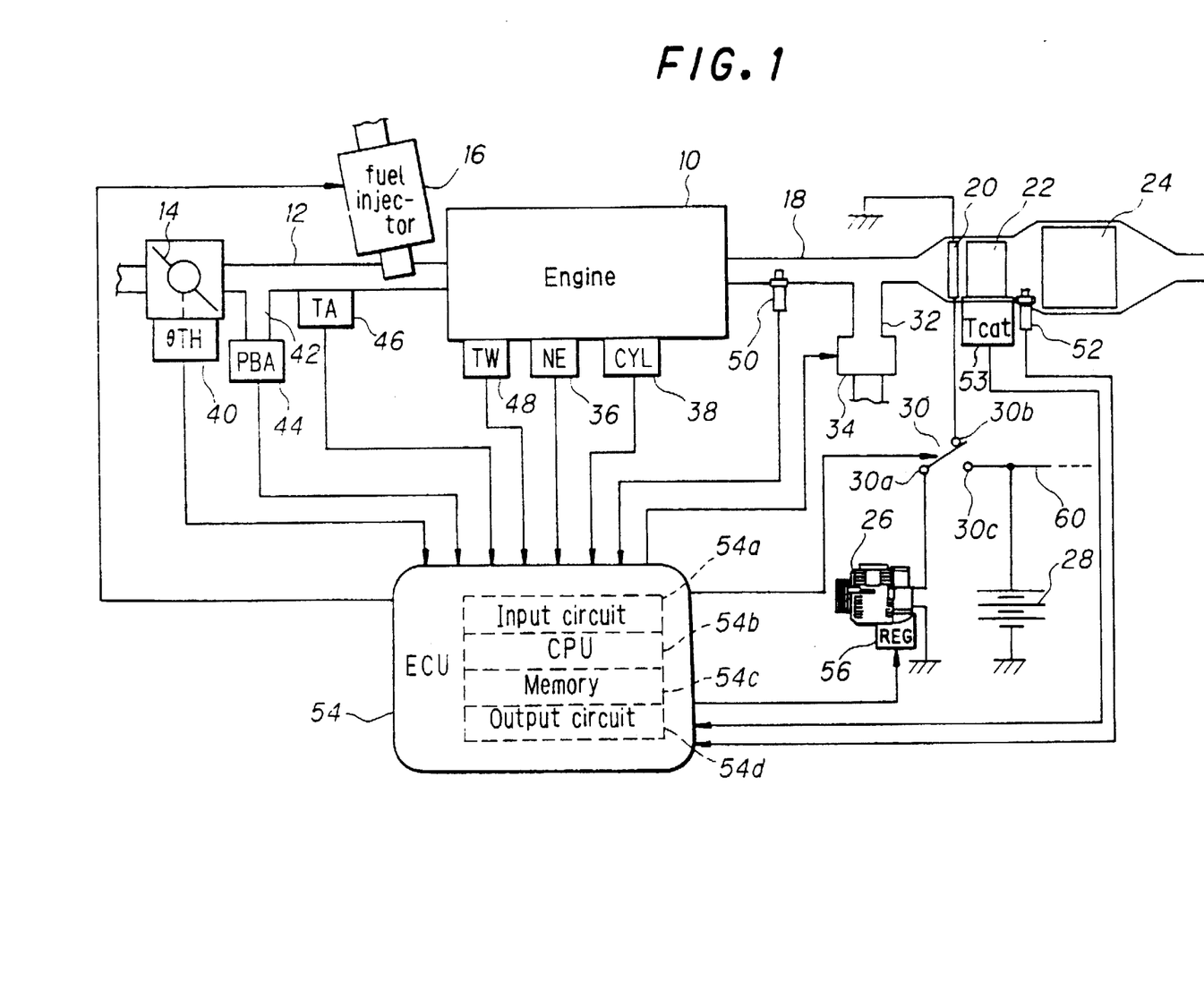
FIG. 1 is an overall schematic view showing a system for detecting a failure or trouble of an electrically heated catalytic converter of an internal combustion engine according to the invention.

FIG. 1 is an overall schematic view showing a system for detecting a failure or trouble of an electrically heated catalytic converter of an internal combustion engine according to the invention.

Reference numeral 10 in this figure designates a multi-cylinder engine such as a four-cylinder internal combustion engine. Air drawn into an air intake pipe 12 through an air cleaner (not shown) mounted on a far end thereof is supplied to each of the first to fourth cylinders through a surge tank and an intake manifold (neither shown), while the flow thereof is adjusted by a throttle valve 14 provided in the air intake pipe 12. A fuel injector 16 for injecting fuel is installed in the vicinity of intake valves (not shown) of each cylinder of the engine. The injected fuel mixes with the intake air to form an air-fuel mixture that is ignited in the associated cylinder by a spark plug (not shown). The resulting combustion of the air-fuel mixture drives a piston (not shown) down.

The exhaust gas produced by the combustion is discharged through exhaust valves and an exhaust manifold (neither shown) to an exhaust pipe 18. The exhaust pipe 18 is installed with, in order from the upstream side (in terms of exhaust gas flow), the aforesaid electrically heated catalytic converter (hereinafter referred to as "EHC") 20 having a heater (not expressly shown), a start catalytic converter 22 and a three-way catalytic converter 24, which burn off the remaining HC, CO, and NOx emissions in the exhaust gases which escape from the cylinders thus reducing pollutants in the exhaust gases from the engine exhaust system. The start catalytic converter 22 (known as a "light-off catalyst") is configured to have a relatively small diameter and volume and is provided in particular for enhancing catalyst conversion efficiency immediately after engine starting.

Figure 2:
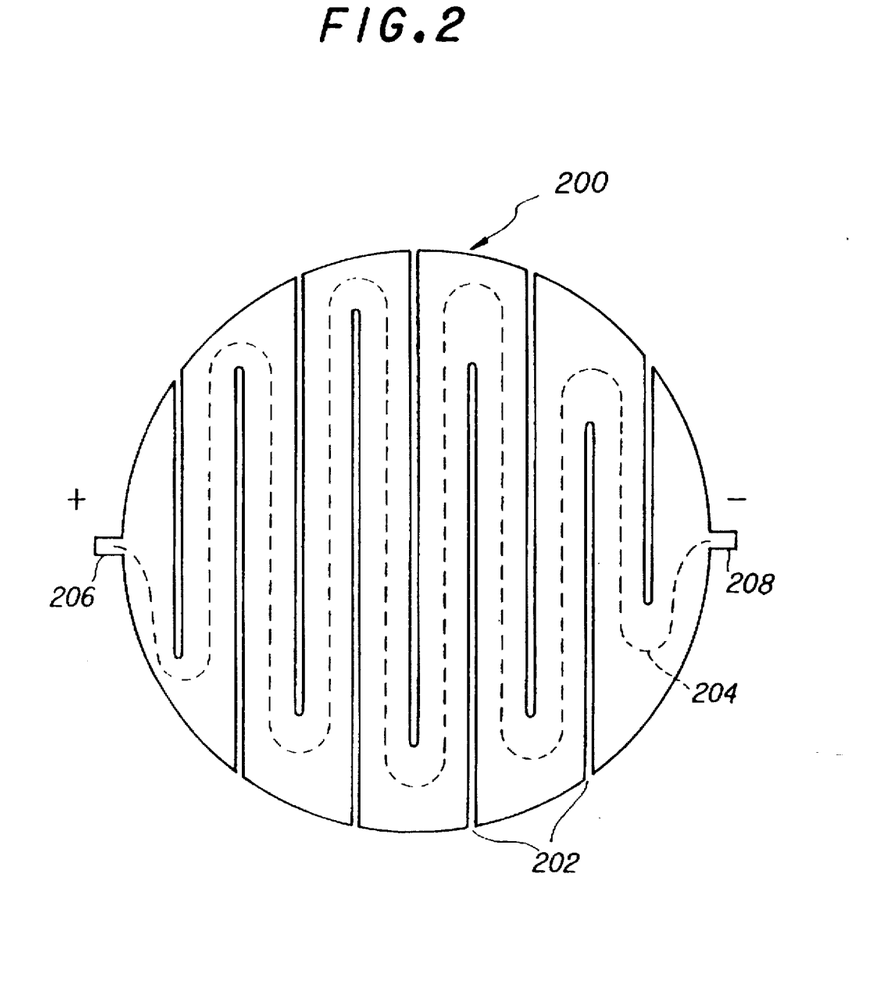
FIG. 2 is an explanatory plan view of a carrier that carries the catalyst of the electrically heated catalytic converter illustrated in FIG. 1.

The body of the EHC 20, i.e., a carrier that carries the catalyst is made of a metal mesh. The metal mesh is manufactured by extruding metallic materials, then by sintering them to a ceramic bar, and then by cutting the bar into disc-shaped slices of 10 cm thickness. As illustrated in FIG. 2, the metal mesh 200 is provided with slits 202 for a current supply path 204 therebetween. Thus, the metal mesh itself is configured to be an electric heater. The current path has an anode 206 and a cathode 208 at opposite ends thereof.

As illustrated in the figure, an alternator 26 is provided in the vicinity of the engine 10. The alternator 26 is connected to the crankshaft (not shown) of the engine 10 and is driven to produce electric power. The generated electric power is supplied to the EHC 20 or a battery 28. More specifically, a switch 30 is inserted in the current supply circuit. When terminals 30a and 30b are connected, the anode of the metal mesh (heater) of the EHC 20 is connected with the alternator 26 to be supplied with current for heating up. As a result, the heated EHC 20 burns off the remaining emissions generated immediately after the engine starting. The EHC 20 further heats up with the heat generated by the chemical reaction of the burning and promptly reaches the activation temperature, thereby promoting the start catalytic converter 22 and the three-way catalytic converter 24 installed downstream thereof to activate.

The exhaust pipe 18 is connected with a conduit 32 which has an air pump 34 at the opposite end for supplying secondary air. Since a large amount of unburned gases are produced at engine starting, the air pump 34 is installed to supply air to the exhaust pipe 18 to promote burning, thereby enhancing conversion efficiency of the catalysts.

A crankshaft position sensor 36, illustrated as "NE" in the figure, is provided on the camshaft or crankshaft (neither shown) which produces a signal once per predetermined crank angular position. A camshaft position sensor 38, illustrated as "CYL" in the figure, is similarly provided on the camshaft (not shown) which produces a signal at a prescribed crank angular position of the first cylinder. A throttle position sensor 40, illustrated as "θTH" in the figure, is connected to the throttle valve 14 to detect, and to generate a signal indicative of, the degree of opening of the throttle valve 14.

The air intake pipe 12 is branched off downstream of the position where the throttle valve 14 is placed, to have a branch 42. A manifold absolute pressure sensor 44, illustrated as "PBA" in the figure, is installed at the far end of the branch 42, to detect, and to generate a signal indicative of, the intake manifold pressure downstream of the throttle valve 14 in terms of absolute pressure.

In addition, the air intake pipe 12 is provided with an intake air temperature sensor 46, illustrated as "TA" in the figure, for detecting, and for generating a signal indicative of, the temperature of the intake air; and an engine coolant temperature sensor 48, illustrated as "TW" in the figure, for detecting, and for generating a signal indicative of, the temperature of the engine coolant is provided at a suitable location on the engine 10.

On the other hand, the exhaust pipe 18 is provided with, upstream of the intersection where the conduit 32 is connected, a first oxygen sensor 50 comprising an $O_2$ sensor for detecting, and for generating a signal indicative of, the oxygen content in the exhaust gases. The exhaust pipe 18 is further provided with a second oxygen sensor 52 similarly comprising an $O_2$ sensor, at a position between the start catalytic converter 22 and the three-way catalytic converter 24. A temperature sensor 53, illustrated as "Tcat" in the figure, is provided in the proximity of the second $O_2$ sensor 52 to detect, and for generating a signal indicative of, the exhaust system ambient temperature.

The first and second $O_2$ sensors are respectively provided with a heater which heats up the detection element comprised of a special ceramic core, upon receipt of current from current supply circuits (neither shown). Since the structure and configuration of the $O_2$ sensors of this kind are known from prior art references such as Japanese Laid-Open Patent Application Nos. Hei 1(1989)-232,246 and Hei 2(1990)-24, 550, no further explanation thereof will be made.

The signals outputted from the sensors are sent to a control unit 54 that is illustrated as "ECU" in the figure.

The ECU 54 comprises a microcomputer made up of an input circuit 54a, a CPU 54b, a memory 54c and an output circuit 54d. The input circuit 54a carries out various procedures including shaping some sensor signal waveforms, converting some sensor signals to predetermined levels in voltage, and converting some analog sensor signals into digital values. The memory 54c stores various data including calculation programs and the results of the calculations in response to the instructions made by the CPU 54b.

The CPU 54b operates, via the switch 30, to connect the alternator 26 to the EHC 20 to supply current thereto in response to the detected parameters. The alternator 26 has a regulator 56. The CPU 54b determines and outputs a pulse train indicative of a duty cycle in a pulse-width modulation control such that the alternator 26 produces the electric power at a level determined by the duty cycle.

In the switch 30, on the other hand, when the terminal 30a is switched to connect with the terminal 30c, the alternator 26 is connected with the battery 28 to charge it. The battery 28 is connected, through a line 60, to various electric loads including an electric motor (not shown) of the air pump 34. The CPU 54b controls the operation of the air pump 34 by controlling the operation of the motor, and controls fuel metering through the fuel injector 16. More specifically, the CPU 54b determines the quantity of fuel injection in terms of time and controls the fuel injector 16 to open for the determined time.

Figure 3:
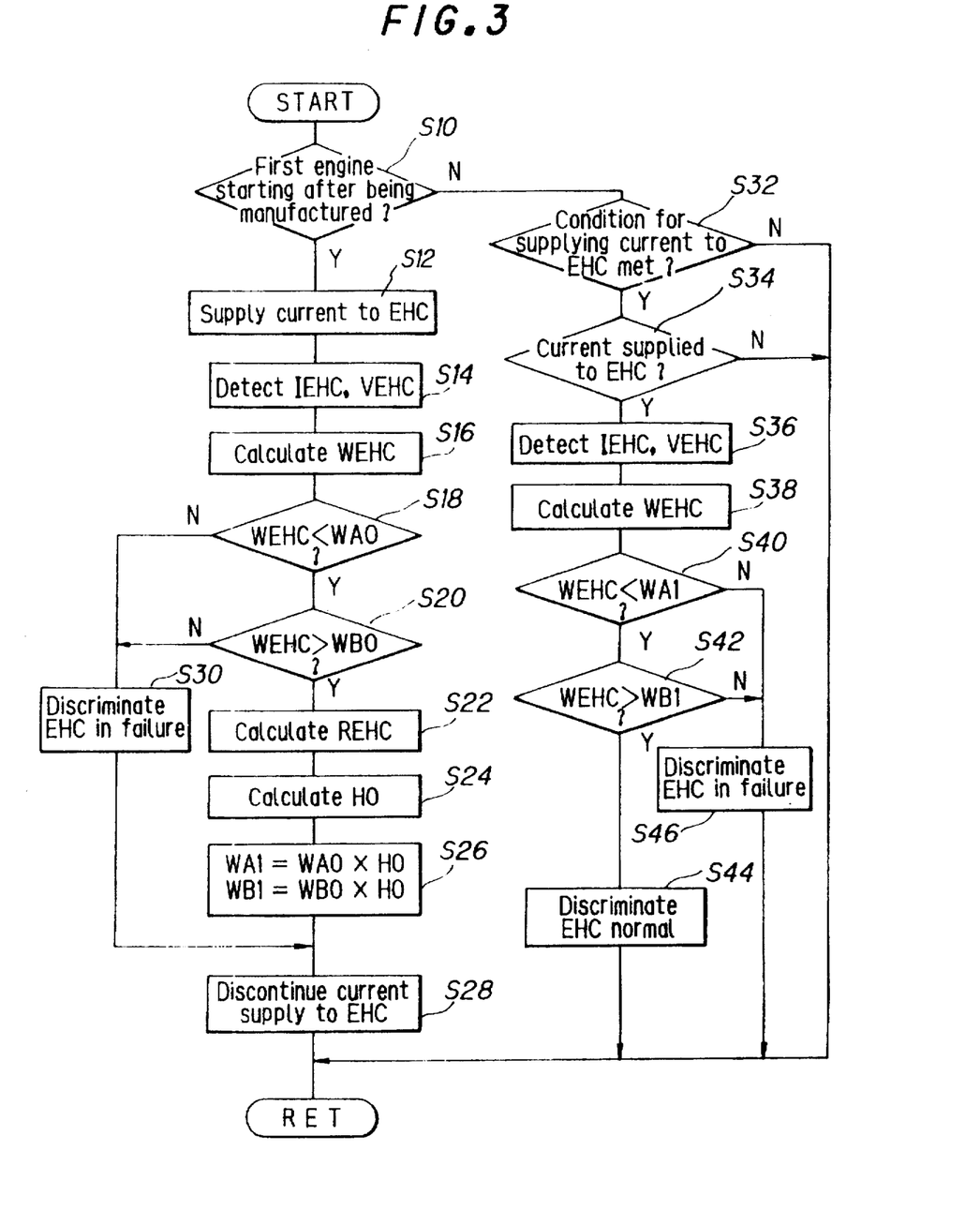
FIG. 3 is a flowchart showing the operation of the system illustrated in FIG. 1.

FIG. 3 is a flowchart illustrating the operation of the system according to the invention.

Since, however, the system detects or monitors the current, etc., supplied to the heater of the EHC 20 to detect if a failure has occurred in the heater, the detection of the current is first explained.

Figure 4:
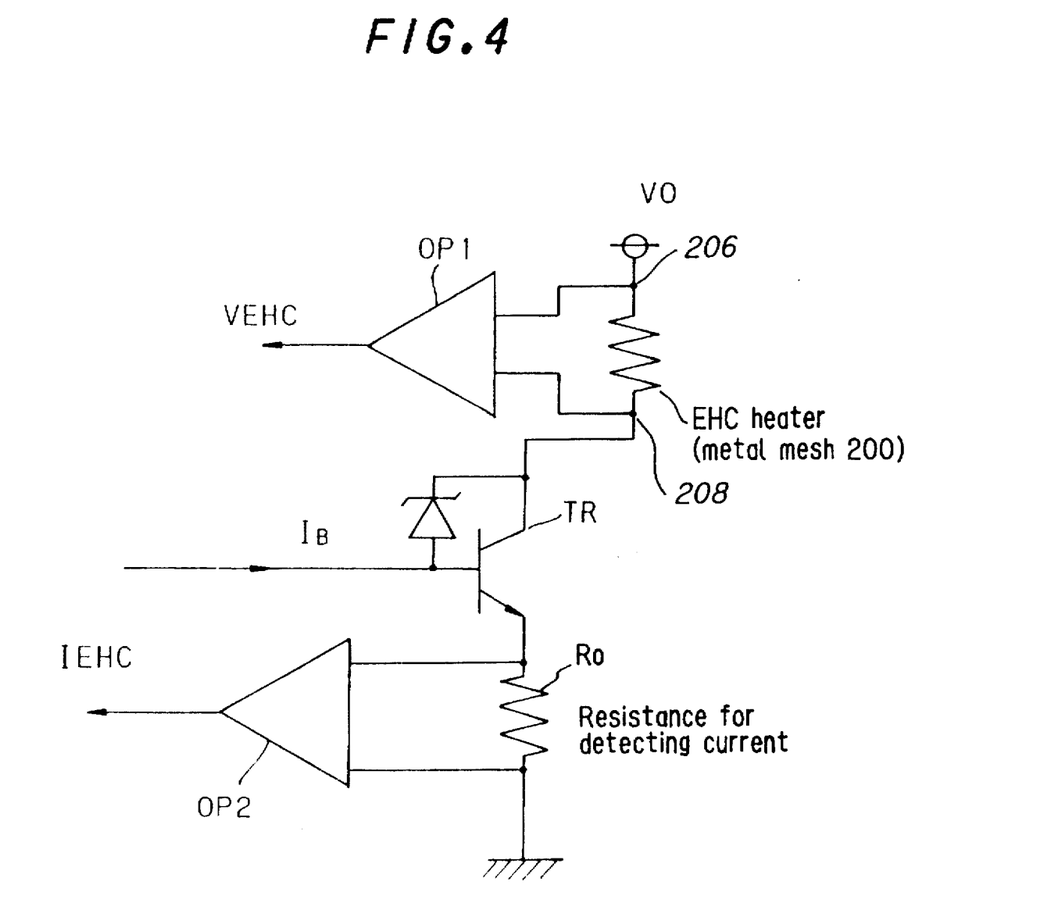
FIG. 4 is a circuit diagram for detecting or monitoring the current to be supplied to the catalytic converter.

FIG. 4 is a circuit diagram for detecting the current and voltage applied to the heater of the EHC 20. As illustrated, the anode 206 and the cathode 208 of the metal mesh 200 (heater) are connected to the voltage source VO (alternator 26) and the voltage is applied to the heater to supply current, when a base current IB is supplied to a power transistor TR. The voltage at the both ends of the EHC heater is taken to the ECU 54 through an operational amplifier OP1 and the voltage drop across the heater is detected and monitored in the ECU 54. The voltage is hereinafter referred to as VHEC.

A resistor Ro (shunt resistor) is inserted between the emitter terminal of the power transistor TR and ground for current detection. Specifically, the voltages at the both ends of the resistor Ro are taken to the ECU 54 via a second operational amplifier OP2 and the current passing through the EHC heater is detected in the ECU 54 based on the voltage drop across the resistor Ro. The current is hereinafter referred to as IEHC.

As a result, the accumulated value of the electric power that the EHC heater consumes for a period will be obtained by multiplying IEHC and VEHC and by integrating the products. The accumulated value of the electric power consumption is hereinafter referred to as WEHC [W].

Here, the resistance of the EHC heater, hereinafter referred to as REHC, will be calculated as:

$$REHC = VEHC/(IEHC - IB).$$

Since IEHC>IB, it can be approximated as:

$$REHC \approx VEHC/IEHC.$$

In the above, to detect or calculate IEHC and VEHC applied to the EHC 20 is therefore the same as to detect or calculate a parameter indicative of the resistance REHC of the EHC 20.

Based on the above, the operation of the system will be explained with reference to the flowchart of FIG. 3.

The program begins at S10 in which it is checked whether it is the first time for the engine to be started. Specifically, it is checked if it is the first starting after the engine has been manufactured. More specifically, this checking is made by inputting a signal to the ECU 54 through a switch (not shown) manually operated. As will be discussed later, this is one example and any other stage can instead be used.

When the result in S10 is affirmative, the program goes to S12 in which the base current is supplied to the power transistor TR to supply current to the heater of the EHC 20. The program then proceeds to S14 in which the current IEHC and the voltage VEHC are detected or monitored, and to S16 in which the product of the values are calculated and are integrated to determine the accumulated value of the electric power consumption WEHC [W]. The detection of IEHC, VEHC and the calculation of the product (electric power) should preferably be continued for a predetermined period, e.g., 30 seconds, and the resultant electric powers are successively integrated for the period to calculate or determine the accumulated value of electric power consumption WEHC.

The program then goes to S18 in which it is checked whether WEHC is less than an initial upper reference value WA0 and if it is, the program goes to S20 in which it is again checked whether WEHC is greater than an initial lower reference value WB0. When the result in S20 is affirmative, the program goes to S22 in which the resistance REHC is calculated in accordance with the equation mentioned above, and to S24 in which a correction coefficient named H0 is calculated as follows:

$$H0 = (\text{designed resistance before manufacturing})/(\text{measured resistance after manufacturing})$$

In the above, the designed resistance is a value calculated at the time of designing the engine and the EHC heater and before manufacturing the same, and the measured value is the value REHC calculated in S22. The correction coefficient H0 is thus calculated or determined based on the ratio between the designed resistance and the measured resistance. When the two values are equal, the correction coefficient H0 is therefore 1.0.

Figure 5:
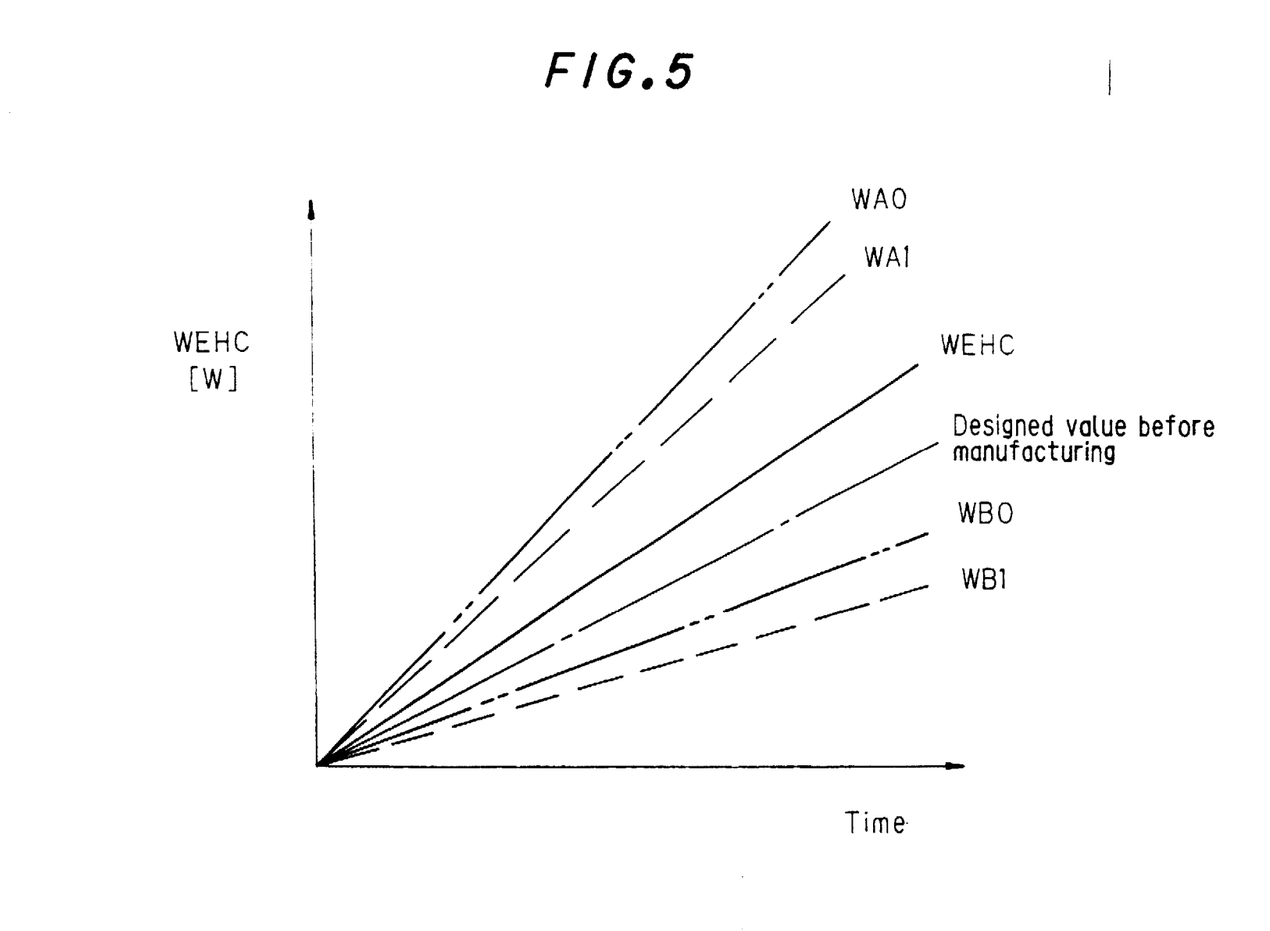
FIG. 5 is an explanatory graph showing the correction of reference values to be used in the failure detection.

The program then proceeds to S26 in which the initial upper and lower reference values WA0, WB0 are respectively multiplied by the calculated correction coefficient H0 to be corrected or updated. The corrected values are renamed as WA1,WB1. FIG. 5 shows this correction. The program then advances to S28 in which the current supply to the EHC heater is discontinued.

In the above, if the result in S18 or S20 is negative, the program goes to S30 in which it is detected or discriminated that a failure or trouble has occurred in the EHC 20. The failure or trouble will be short circuiting, breakage of cables, etc.

On the other hand, when S10 finds that it is not the first engine starting, the program goes to S32 in which it is checked whether the condition for supplying current to the EHC 20 (such as cold engine starting) is met, and if it is, the program goes to S34 where it is checked whether the current supply to the EHC 20 is in progress. Since, except for the first engine starting, the current supply control to the EHC is conducted in another routine, this checking is conducted by referring to an appropriate flag used in the other routine.

When the result in S34 is affirmative, the program goes to S36 in which IEHC, VEHC are detected, and to S38 in which WEHC is calculated in the manner explained above. The program then moves to S40 in which it is checked whether the calculated WEHC is lesser than the corrected upper reference value WA1 and if it is, to S42 in which it is again checked whether the calculated WEHC is greater than the corrected lower reference value WB1.

When the result in S42 is affirmative, the program goes to S44 in which the EHC 20 is discriminated or detected to be normal. On the contrary, when the result in S40 or S42 is negative, the program proceeds to S46 in which it is detected or discriminated that a failure or trouble has occurred in the EHC 20.

Moreover, when the result in S32 or S34 is negative, the program is immediately terminated. Although not shown in the flowchart, the air pump 34 is controlled to provide compressed air in the exhaust pipe 18 simultaneously with the current supply to the heater of the EHC 20.

In the embodiment, thus, the electric resistance of the EHC 20 is detected or calculated at the time of first engine starting after the engine has been manufactured to calculate or determine the ratio between the designed resistance before manufacturing and measured resistance after manufacturing. And based on the ratio, a correction coefficient is calculated or determined to correct initial upper and lower reference values. Further, it is configured such that the accumulated value of the electric power consumption of the EHC 20 is calculated in a later usual engine operation and the EHC 20 is detected or discriminated to be in failure when the calculated accumulated value is out of the range defined by the corrected upper and lower reference values.

As stated earlier, the electric load of the metal mesh 200 (heater) of the EHC 20 is some tens to hundreds milliohms in resistance and is quite small. It is therefore difficult to decrease variances in manufacturing the same. Further, cables and sensors and some similar elements used in the current detection circuit are also not free from variances in manufacturing. In the prior art failure detection, it was therefore necessary to broaden the range for failure detection such that the EHC 20 was liable to be discriminated to be normal. In the prior art failure detection, in other words, the range to be discriminated to be normal had to be loosened, causing the failure detection accuracy to be degraded.

Having been configured in the manner, however, it becomes possible to determine the upper and lower reference values for failure detection, in accordance with the characteristics of individual EHCs. As a result, it becomes possible to adjust for manufacturing variance among EHCs and to accurately determine the reference values, improving detection accuracy.

It will therefore be apparent from the foregoing that, although it is checked in S10 whether it is the first time for the engine to be started, the reference value correction is not limited to this. Instead, the reference value correction can be made at any time such as before being supplied to the market. Moreover, it is possible to make the reference value correction utilizing a periodical checking at a service center which is carried out after the user has run the engine for a predetermined distance.

It should be noted in the above that, although the accumulated value of the electric power consumption WEHC is compared with the reference values, it is alternatively possible to compare the resistance REHC with appropriately set references values. Further, it is alternatively possible to use either of the current IEHC or the voltage VEHC, although the detection accuracy will be degraded.

It should further be noted that, although it is configured such that the correction coefficient is calculated based on the ratio between the designed value and the measured value and the reference values are multiplied by the correction coefficient to correct or update the same, it is alternatively possible to obtain the difference between the designed value and the measured value and to correct or update the reference values by adding the difference thereto.

It should be further noted that, although the upper and lower reference values are determined for failure detection, it is alternatively possible to determine a single reference value for failure detection.

It should further be noted that it is alternatively possible to use a hall-effect element for current detection.

It should further be noted that, although the EHC has been explained as being manufactured through extrusion, the EHC should not be limited to this type. Instead, it is alternatively possible to manufacture it in the shape of the so-called metal-wheel type, by winding a metal ribbon spirally.

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A system for detecting a failure occurred of an electrically heated catalytic converter of an internal combustion engine, including:
   a catalytic converter installed in an exhaust system of the engine for reducing pollutants from exhaust gases emitted from the engine, the catalytic converter having a heater;
   a power source;
   current supplying means for connecting the power source to the heater of the catalytic converter to supply current thereto;
   parameter detecting means for detecting a parameter indicative of an electric resistance of the heater of the catalytic converter;
   reference value determining means for determining at least one reference value;
   comparing means for comparing the parameter with said at least one reference value to determine if a failure has occurred in the heater of the catalytic converter;
   wherein the improvement comprises:
   correcting means for correcting said at least one reference value based on a value obtained at least by the parameter.

2. A system according to claim 1, wherein the value obtained at least by the parameter is a ratio between a value of the parameter designed before the catalytic converter was manufactured and a value of the a parameter measured after the catalytic converter was manufactured.

3. A system according to claim 2, wherein said correcting means corrects said at least one reference value by multiplying said at least one reference by the ratio.

4. A system according to claim 1, wherein the parameter is an electric power consumed by the heater of the catalytic converter.

5. A system for detecting a failure of an electrically heated catalytic converter of an internal combustion engine, including:
   a catalytic converter installed in an exhaust system of the engine for reducing pollutants from exhaust gases emitted from the engine, the catalytic converter having a heater;
   a power source;
   current supplying means for connecting the power source to the heater of the catalytic converter to supply current thereto;
   parameter detecting means for detecting a parameter indicative of an electric resistance of the heater of the catalytic converter;
   reference value determining means for determining a plurality of reference values;
   discriminating means for discriminating if the parameter is within a range defined by the plurality of reference values to determine if a failure has occurred in the heater of the catalytic converter;
   wherein the improvement comprises:
   correcting means for correcting said plurality of reference values at a specific condition based on a correction coefficient obtained at least by the parameter.

6. A system according to claim 5, wherein the correction coefficient obtained at least by the parameter is a ratio between a value of the parameter designed before the catalytic converter was manufactured and a value of the parameter measured after the catalytic converter was manufactured.

7. A system according to claim 6, wherein said correcting means corrects said plurality of reference values by multiplying said plurality of reference values by the correction coefficient.

8. A system according to claim 5, wherein the parameter is an electric power consumed by the heater of the catalytic converter.

9. A system according to claim 5, wherein the specific condition is a condition after the engine is first started after manufactured.

10. A method for detecting a failure occurred of an electrically heated catalytic converter of an internal combustion engine, including:
    a catalytic converter installed in an exhaust system of the engine for reducing pollutants from exhaust gases emitted from the engine, the catalytic converter having a heater; and
    a power source;
    the method comprising the steps of:
    connecting the power source to the heater of the catalytic converter to supply current thereto;
    detecting a parameter indicative of an electric resistance of the heater of the catalytic converter;
    determining at least one reference value;
    comparing the parameter with said at least one reference value to determine if a failure has occurred in the heater of the catalytic converter;

wherein the improvement comprises:

correcting said at least one reference value based on a value obtained at least by the parameter.

11. A method according to claim 10, wherein the value obtained at least by the parameter is a ratio between a value of the parameter designed before the catalytic converter was manufactured and a value of the a parameter measured after the catalytic converter was manufactured.

12. A method according to claim 11, wherein correcting said at least one reference value by multiplying said at least one reference by the ratio.

13. A method according to claim 10, wherein the parameter is an electric power consumed by the heater of the catalytic converter.

14. A method for detecting a failure of an electrically heated catalytic converter of an internal combustion engine, including:

a catalytic converter installed in an exhaust system of the engine for reducing pollutants from exhaust gases emitted from the engine, the catalytic converter having a heater; and a power source;

the method comprising the steps of:

connecting the power source to the heater of the catalytic converter to supply current thereto;

detecting a parameter indicative of an electric resistance of the heater of the catalytic converter;

determining a plurality of reference values;

discriminating if the parameter is within a range defined by the plurality of reference values to determine if a failure has occurred in the heater of the catalytic converter;

wherein the improvement comprises:

correcting said plurality of reference values at a specific condition based on a correction coefficient obtained at least by the parameter.

15. A method according to claim 14, wherein the correction coefficient obtained at least by the parameter is a ratio between a value of the parameter designed before the catalytic converter was manufactured and a value of the parameter measured after the catalytic converter was manufactured.

16. A method according to claim 15, wherein correcting said plurality of reference values by multiplying said plurality of reference values by the correction coefficient.

17. A method according to claim 14, wherein the parameter is an electric power consumed by the heater of the catalytic converter.

18. A method according to claim 14, wherein the specific condition is a condition after the engine is first started after manufactured.

19. A computer program for detecting a failure occurred of an electrically heated catalytic converter of an internal combustion engine, including:

a catalytic converter installed in an exhaust system of the engine for reducing pollutants from exhaust gases emitted from the engine, the catalytic converter having a heater; and a power source;

the computer program comprising the steps of:

connecting the power source to the heater of the catalytic converter to supply current thereto;

detecting a parameter indicative of an electric resistance of the heater of the catalytic converter;

determining at least one reference value;

comparing the parameter with said at least one reference value to determine if a failure has occurred in the heater of the catalytic converter;

wherein the improvement comprises:

correcting said at least one reference value based on a value obtained at least by the parameter.

20. A computer program for detecting a failure of an electrically heated catalytic converter of an internal combustion engine, including:

a catalytic converter installed in an exhaust system of the engine for reducing pollutants from exhaust gases emitted from the engine, the catalytic converter having a heater; and a power source;

the computer program comprising the steps of:

connecting the power source to the heater of the catalytic converter to supply current thereto;

detecting a parameter indicative of an electric resistance of the heater of the catalytic converter;

determining a plurality of reference values;

discriminating if the parameter is within a range defined by the plurality of reference values to determine if a failure has occurred in the heater of the catalytic converter;

wherein the improvement comprises:

correcting said plurality of reference values at a specific condition based on a correction coefficient obtained at least by the parameter.

* * * * *